(12) United States Patent
Goldring et al.

(10) Patent No.: US 6,397,125 B1
(45) Date of Patent: May 28, 2002

(54) METHOD OF AND APPARATUS FOR PERFORMING DESIGN SYNCHRONIZATION IN A COMPUTER SYSTEM

(75) Inventors: Robert David Goldring, Morgan Hill; Scott K. Chan, Milpitas, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/215,748

(22) Filed: Dec. 18, 1998

(51) Int. Cl.$^7$ .............................................. G06F 12/00
(52) U.S. Cl. ........................................ 700/200; 707/8
(58) Field of Search ................... 707/200–201, 707/203–205, 104, 8

(56) References Cited

U.S. PATENT DOCUMENTS

| | | | | | |
|---|---|---|---|---|---|
| 4,875,159 A | * | 10/1989 | Carey et al. | ................ | 707/203 |
| 5,403,639 A | * | 4/1995 | Belsan et al. | ................ | 707/204 |
| 5,592,661 A | * | 1/1997 | Eisenberg et al. | ........... | 707/104 |
| 5,675,802 A | * | 10/1997 | Allen et al. | ..................... | 717/3 |
| 5,708,812 A | * | 1/1998 | Van Dyke et al. | ............ | 717/11 |
| 5,737,601 A | * | 4/1998 | Jain et al. | ................... | 707/201 |
| 5,819,020 A | * | 10/1998 | Beeler, Jr. | ...................... | 714/5 |
| 5,924,096 A | * | 7/1999 | Draper et al. | .................. | 707/10 |
| 5,950,198 A | * | 9/1999 | Falls et al. | ..................... | 707/8 |
| 5,956,489 A | * | 9/1999 | San Andres et al. | ......... | 709/221 |
| 5,991,771 A | * | 11/1999 | Falls et al. | .................. | 707/202 |
| 6,029,178 A | * | 2/2000 | Martin et al. | ................ | 707/201 |
| 6,035,412 A | * | 3/2000 | Tamer et al. | .................. | 714/6 |

OTHER PUBLICATIONS http://www.oracle.com/products/oracle7/server/whitepapers/replication/html/chapter9.html.

* cited by examiner

*Primary Examiner*—Thomas Black
*Assistant Examiner*—Mary Wang
(74) *Attorney, Agent, or Firm*—Sawyer Law Group LLP; Ingrid M. Foerster

(57) ABSTRACT

A method of performing design synchronization in a computer system is described. At least a portion of a source schema and at least a portion of a target schema are compared. The target schema is modified based on the differences therebetween. In a preferred fashion, design changes are made at the target with target-specific syntax and the minimum number of equivalent operations.

9 Claims, 8 Drawing Sheets

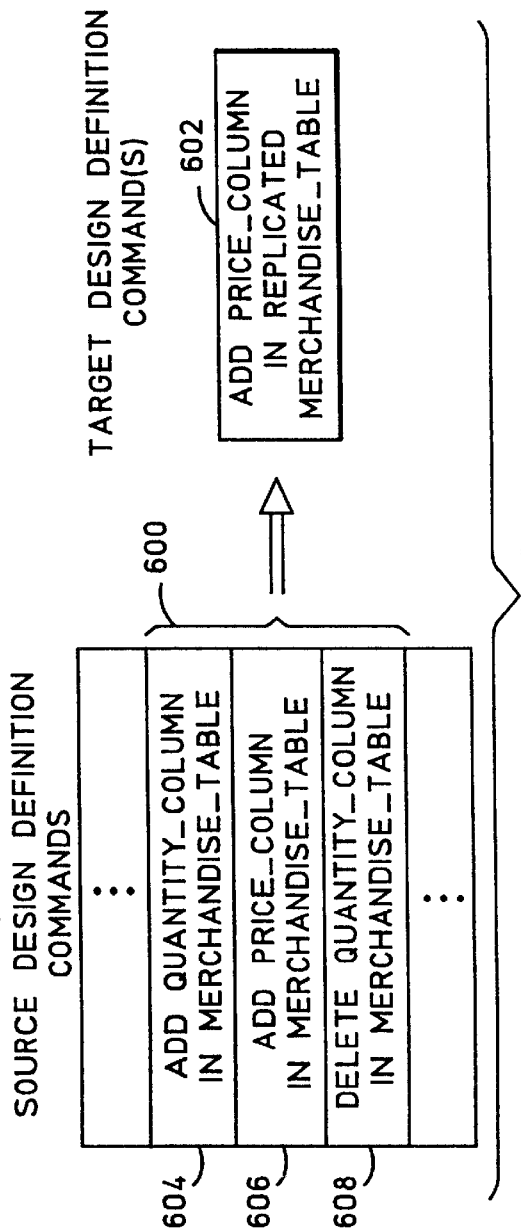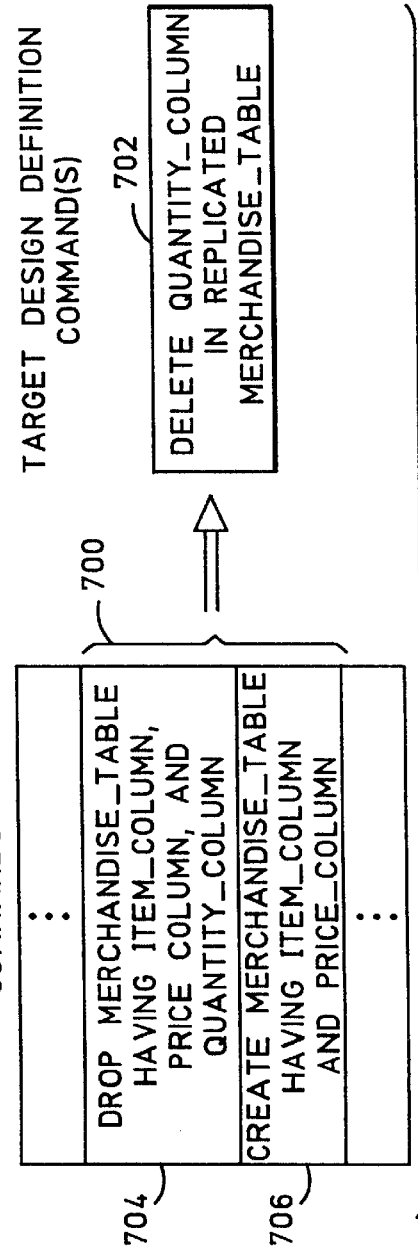

METHOD OF AND APPARATUS FOR PERFORMING DESIGN SYNCHRONIZATION IN A COMPUTER SYSTEM

BACKGROUND OF THE INVENTION

1. Field of the Invention

The present invention relates generally to replication in computer systems having two or more databases, and more particularly to design synchronization in such a system.

2. Description of the Related Art

A computer system may have two or more databases connected through a network, where at least one of the databases has data tables that are "replicated" from data tables in one or more of the other databases. In general, replication involves the process of taking table changes stored in one database at a "source" server and applying those changes to another database at a "target" server. Even when the network is not available, it is desirable that the databases be made continuously available for reading, updating, and maintenance. Such databases may be included in a portable computer, for example, which is only occasionally connected to the network.

The databases may include relational databases storing two-dimensional relations or tables. Here, a database management system (DBMS) stores data and retrieves or updates tables in response to Structured Query Language (SQL) statements. SQL has become the standard language used to interface to such DBMSs in computer systems.

In this replicated environment, there results in a need for appropriate (1) data synchronization, (2) design synchronization, (3) authorization synchronization, and (4) logic synchronization. Data synchronization involves propagating updates to columns in rows of tables in a source database to corresponding replicated columns in rows of tables in a target database. In authorization synchronization, one case exists where a user has access to all databases. Here, as users are granted access to database objects, or existing access privileges are revoked or changed, similar authorization changes on behalf of the user are made on the target database. Another case exists in authorization synchronization where a user has access to one or just a few target databases. Here, access privileges are allowed for the administration of the target database from a remote (and perhaps occasionally-connected) control point. With respect to logic synchronization, appropriate alterations are made to logic elements in a target database as database triggers, stored procedures, or declarative constraints are added, removed, or modified in a source database.

Design synchronization involves propagating updates to the "schema" (design or structure), e.g., updates to the table design in one database as tables and/or table columns are added to or removed from another database. Design synchronization is an important concern for applications where the design of the database might change. Design changes do typically occur in computer systems, albeit perhaps relatively slowly over a period of time.

In some cases, data synchronization might fail if not preceded by design synchronization. For example, if a given column in a table in one database is made larger, then the corresponding column in the other databases might also need to be made larger to avoid resulting failures when trying to save a large value in too small of a space. As the number of databases in the replication network increases, so does the risk associated with not automating the design synchronization.

Conventional products, such as SQL Anywhere™ available from Sybase, have addressed design synchronization using a "save-and-replay" approach. Such conventional products capture data design commands made to one database designated as a consolidation database, and later replay those data design commands on other databases. One advantage to this approach appears to be that few, if any, decisions need to be made as to whether a design change should be replayed at other databases. Remembering what design changes were made, and in what order, appears to be sufficient.

However, implicit in the save-and-replay approach is an assumption that it is actually appropriate to replay the design changes at the other databases. That is, the approach is based on the assumption that all of the same database objects actually exist (or do not exist) everywhere. Put another way, allowing propagation of a design change to table X at the server database is based on the assumption that the table X exists at the target database as well and that the object is in a known state, which may not always be the case.

The save-and-replay approach is also based on an assumption of DBMS homogeneity in the network. While there exists national and international standards for portions of SQL language pertaining to data manipulation (i.e., SELECT, INSERT, UPDATE, and DELETE), only a limited standard exists for data definition statements or commands. Different products utilize proprietary extensions (e.g., CREATE INDEX) which are not covered by the standard. Thus, the assumption that it is appropriate to replay data definition commands in a verbatim manner is based on an assumption that the commands are valid everywhere, which itself is based on the assumption that a homogeneous database network exists. Thus, if a DBMS is utilized in a network, a customer must enforce a de facto standard over the data definition extensions in SQL, a standard that does not exist outside of the customer's controlled environment.

Furthermore, for the save-and-replay approach to work appropriately, controls need to be in place to ensure that database objects are not created or deleted in more than one instance. This is necessary because some SQL commands will fail if repeated after initial execution. For example, once a CREATE TABLE statement has been executed, repeating the same CREATE TABLE statement will fail since the DBMS will not allow an object to be created with an existing name. To avoid this particular problem, conventional products allow SQL data definition commands to be accepted only against the consolidation database; from there, they are replayed against the other databases. Because the replication is integrated with the DBMS, conventional products are able to selectively disable the SQL data definition. There is no such ability in a general, heterogeneous DBMS case.

Accordingly, there is an existing need for an improved method and apparatus for performing design synchronization, especially in pervasive computing scenarios.

SUMMARY OF THE INVENTION

A method of performing design synchronization in a computer system is described herein. At least a portion of a source schema and at least a portion of a target schema are compared. The target schema is modified based on the comparison. In a preferred fashion, design changes are made at the target using the minimum number of equivalent operations and target-specific syntax.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 6 is a first example of design definition commands at a source and target;

FIG. 7 is a second example of design definition commands at a source and target.

DETAILED DESCRIPTION OF THE PREFERRED EMBODIMENTS

Figure 1:
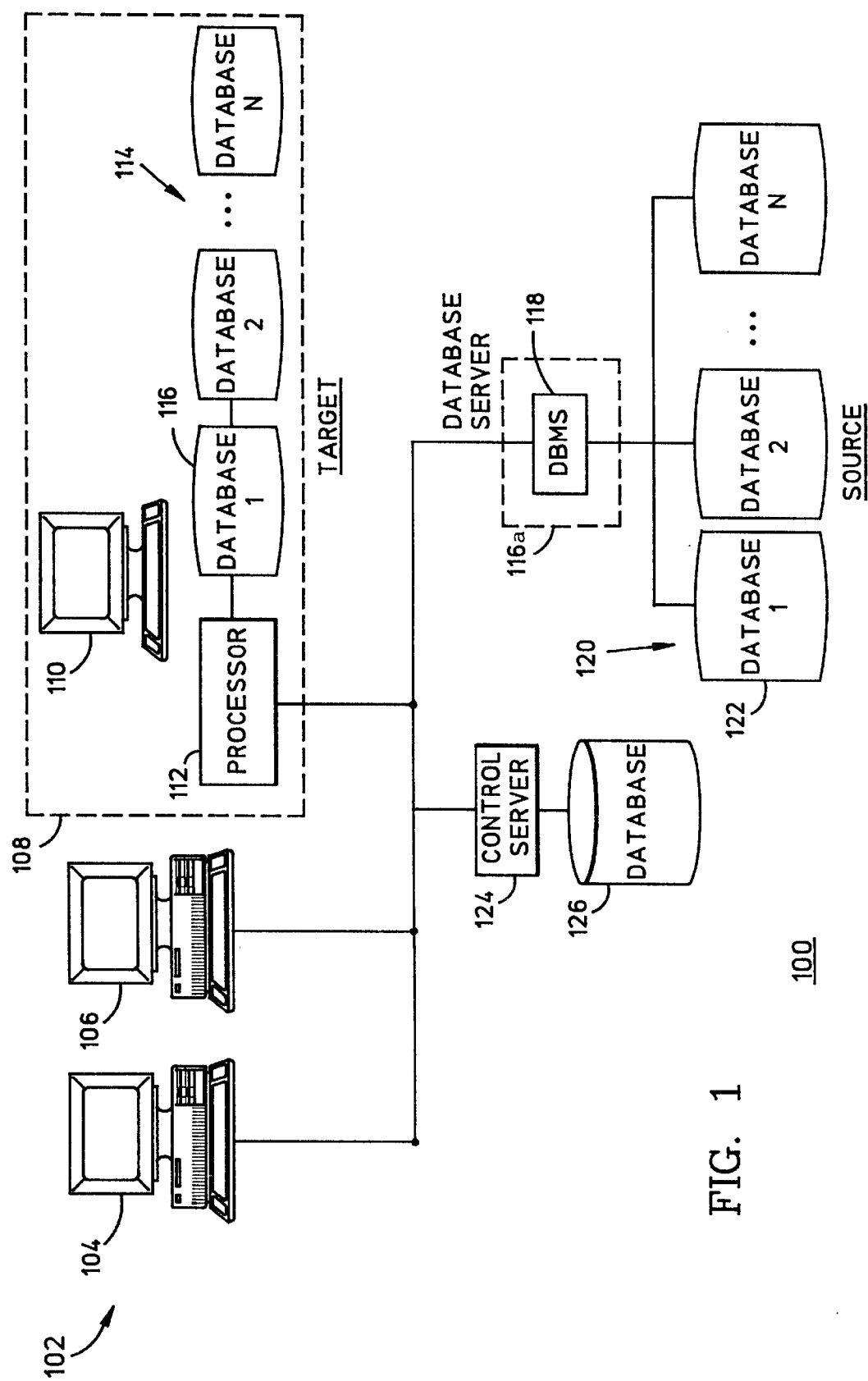
FIG. 1 is a block diagram illustration of a computer system which may embody the present invention.

In accordance with the present invention, a source schema and a target schema are compared. Based on the compare, the target schema is modified to that of the source schema. The present invention generally applies two high-level concepts: (1) notification of a design change; and (2) delayed computation of the net design change in response to the notification.

The design change notification may be planned or by surprise. Planned notification is basically marking down, at the time a design change is first made (or sometime thereafter), that a design change has occurred. Surprise notification is a discovery, during data synchronization, of a mismatch in design (e.g., a replica table not found which should exist, and which must exist for data synchronization to succeed).

In response to either type of notification, design synchronization is performed based on the net design change. Preferably, this occurs immediately preceding data synchronization. Because the net design change is utilized, the present invention is able to accommodate proprietary data definition SQL syntax extensions; exactly-once semantics of some SQL statements (avoiding creation of tables which already exist, deleting objects which do not exist, etc.); in some cases, the distillation of a single design change rather than a replay of an entire series of individual changes; and subset subscriptions, where the structure of copy tables does not match that of the tables in another database, or where some tables that are present in some databases are omitted from others.

Determining what design changes need to be made for synchronization involves analysis of the following meta data: (1) the catalog of the source database; (2) the subscription control information reflecting administrative actions; (3) the list of existing replica tables at the time of the previous design synchronization; and (4) the catalog of the target database.

In an exemplary implementation, the difference between (1) and (2) above is left as an explicit action to be performed by a replication administrator. This allows for selectively omitting objects on a database-by-database basis. For example, a new column in one database might contain sensitive information that should not be given to another workgroup or exposed on a less secure server.

The exemplary implementation also involves determining the differences between (2) and (3) above, and between (2) and (4) above, along with subsequent lookup of detailed information in (1). Computing these differences just before the information is needed allows for the accommodation of autonomous data definition activity, partially completed previous data synchronization, translation of the design change into target-specific syntax, and changes with the minimal number of equivalent operations against the target database.

Determining the difference between (2) and (3) above allows for local, independent objects in a database (objects which are not associated with replication). These independent objects are left alone by the design synchronization process. Tables listed in (3) that are not referenced in (2) are those tables listed in (4) which were created as replicated objects, and should be deleted as they have been removed from the replication specification. Tables that are not referenced in (2) nor (3) are independent objects listed in (4) which should be left alone.

Thus, replication support may be advantageously provided for personal DBMSs in local area network (LAN), occasionally-connected, and mobile environments.

Referring now to FIG. 1, an illustration of a computer system 100 which may embody the present invention is shown. Computer system 100 includes a plurality of computers 102, such as computers 104, 106, and 108. Each computer 104, 106, and 108 may be a conventional workstation, desktop or portable computer, for example. Like other computers 102, computer 108 includes a processor 112 and a plurality of databases 114 (such as a database 116) stored in memory.

Computer system 100 also includes a database server 116a and a plurality of databases 120, such as database 122. Database server 116a may have a database management system (DBMS) 118 for serving relational databases having data stored in tables. As described herein, database server 116a and databases 120 are designated as the "source", whereas computer 108 and databases 114 are designated as the "target." As suggested in the illustration, the source and target are separate and apart from each other in the network. In one embodiment described herein, the source is based on a first database architecture, such as a DB2 relational database architecture provided by International Business Machines (IBM) Corporation, and the target is based on a second database architecture, such as Microsoft Jet database architecture provided by Microsoft Corporation.

Computer system 100 also has a control server 124 coupled to a database 126 for storing replication control information. Control server 124 and database 126 may be a separate entity as shown, or may alternatively be included in or a part of the source or target.

Figure 2:
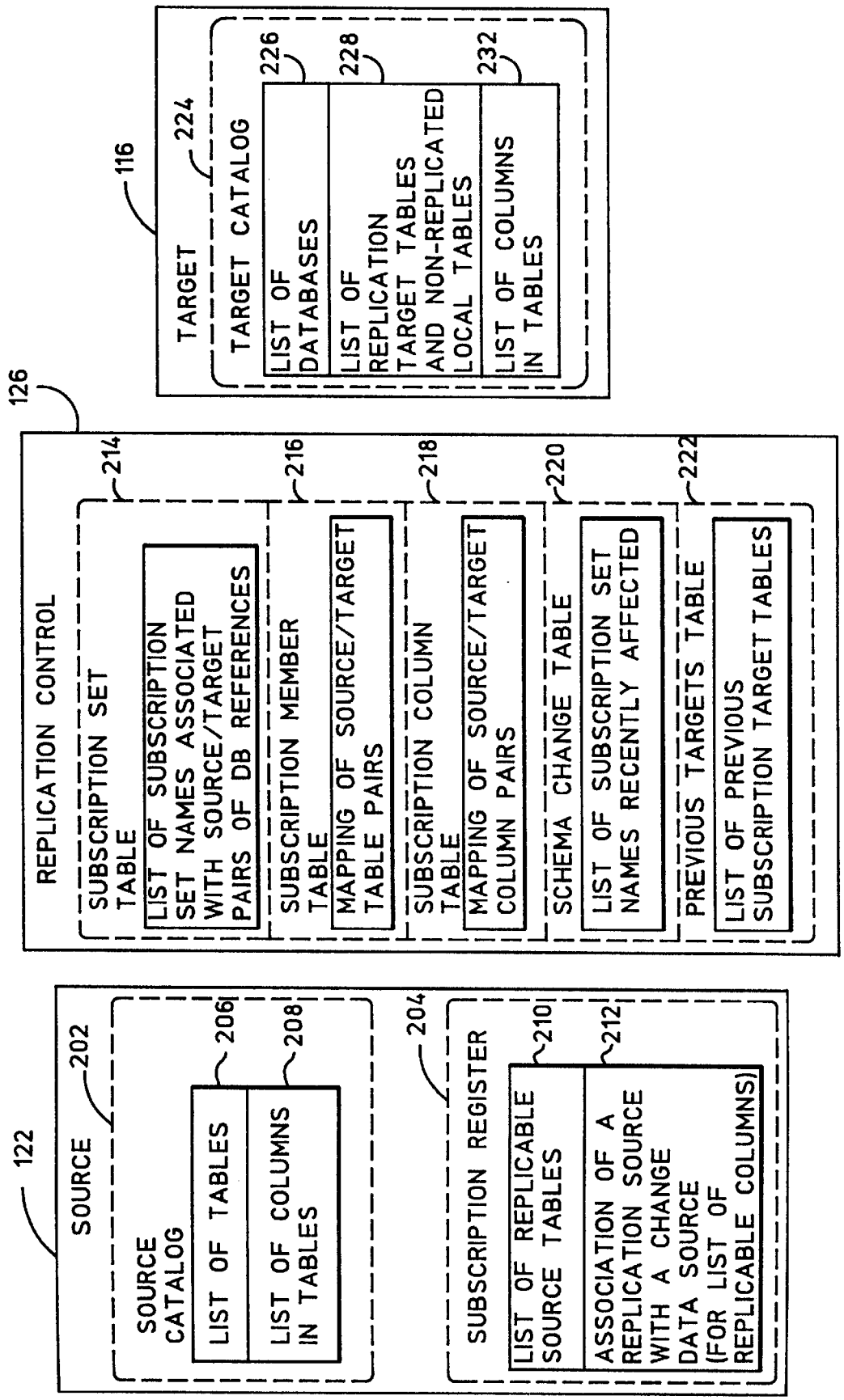
FIG. 2 is a block illustration of meta data information used in the computer system of FIG. 1.

FIG. 2 is a block illustration of meta data information, which includes replication control information, stored within databases of computer system 100 of FIG. 1. On the "source" side, a source catalog 202 includes a list of tables 206 and a list of columns 208 in the tables. In addition, a subscription register 204 includes a list of replicable source tables (or views) 210 and an association 212 of a replication source with a change data source (to which a list of replicable source columns can be identified). Subscription register 204 is a part of the replication control information.

On the "target" side, a target catalog 224 includes a list of databases 226, a list of tables 228 (which include replication target tables and non-replicated local tables), and a list of columns 232 in the tables. Alternatively, the target side may include the same catalog/list structure as the source side, as would be if the source and target employed the same database architecture.

The replication control information includes a SUBSCRIPTION SET table 214, a SUBSCRIPTION MEMBER table 216, a SUBSCRIPTION COLUMN table 218, a SCHEMA CHANGE table 220, and a PREVIOUS TARGETS table 222. SUBSCRIPTION SET table 214 includes a list of subscription set names associated with a pair of source and target database references. SUBSCRIPTION MEMBER table 216 includes a source-to-target table mapping, and SUBSCRIPTION COLUMN table 218 includes a source-to-target column mapping. SCHEMA CHANGE table 220 includes a list of only those subscription set names recently affected by replication administration (i.e., since the last or previous synchronization). PREVIOUS TARGETS table 222 includes a list of subscription target tables known at the time of the last or previous synchronization.

As shown in FIG. 2 for description clarity, source catalog 202 and subscription register 204 are stored at the source in a single database (database 122), target catalog 224 is stored at the target in a single database (database 116), and the replication control information is stored in database 126 associated with the control.

Figure 3:
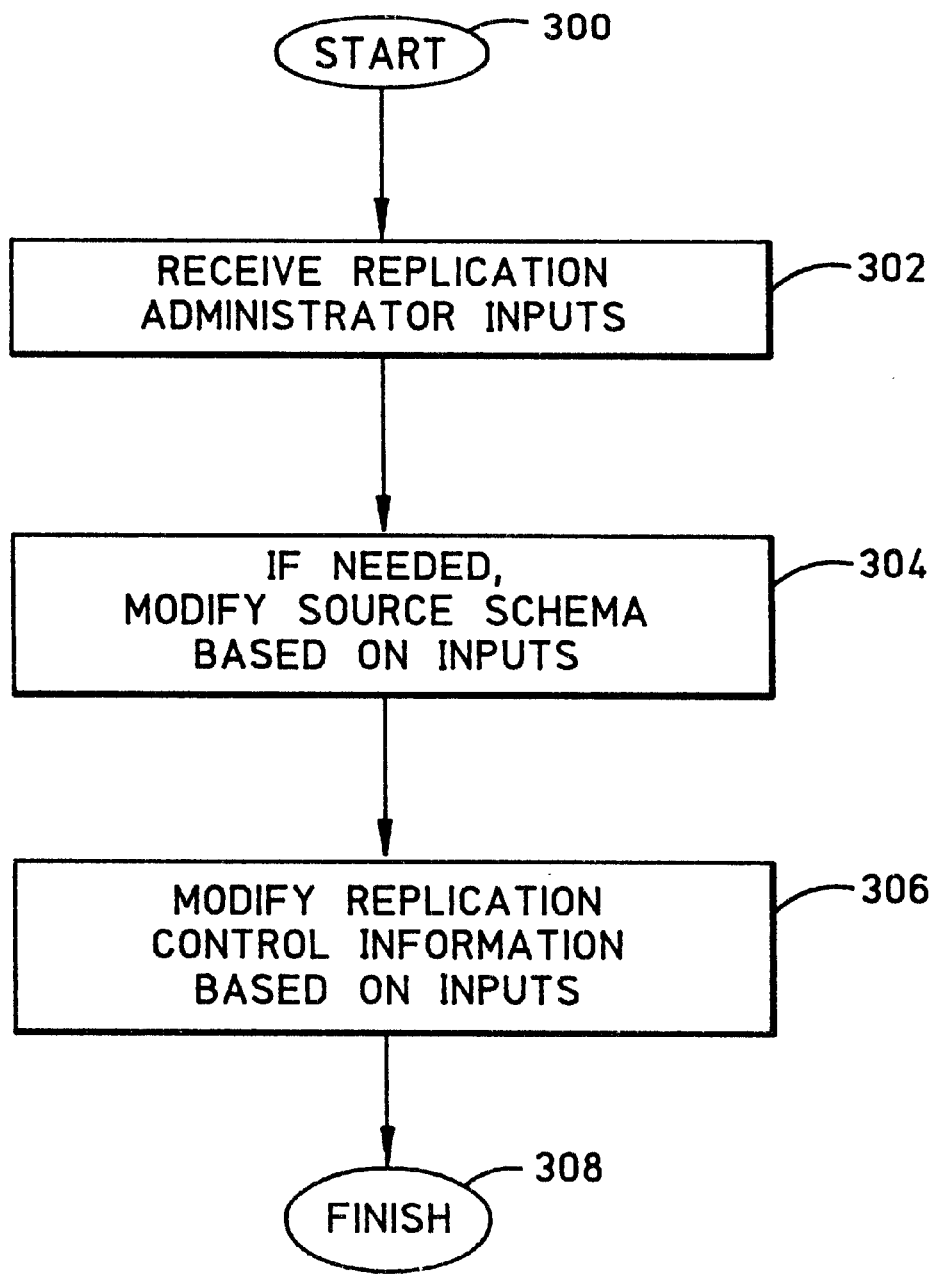
FIG. 3 is a flow chart describing part of a method of performing design synchronization in the computer system of FIG. 1.

FIGS. 3, 4, 5A, and 5B are flowcharts describing different aspects of a method of performing design synchronization in a computer system. More particularly, FIG. 3 is a flowchart describing a method of making changes to the source design and/or to control information through a replication administrator. A replication administrator is a user who is responsible for defining replication sources and subscriptions. Typically, replication administration is performed at a "control center" (such as at one of computers 102 having administration software) by the replication administrator. Replication sources such as DB2 tables or views can be defined, and replication columns within those tables can be specified. In addition, replication targets (i.e., replication subscriptions) can be defined, and target tables, their structures, their sources, and update scheduling can be specified.

Beginning at a start block 300 of FIG. 3, replication administrator inputs are received over a time period (step 302). If a schema change is made (in contrast with a change only to replication rules), the source design is modified based on the inputs (step 304). Here, a number of data definition commands (e.g., SQL statements such as "CREATE TABLE" "DROP TABLE", "ALTER TABLE") are executed to modify the design. These commands may be executed by database server 116 and applied to, for example, one or more source tables in databases 120.

Following step 304, replication control information is modified accordingly (step 306). Some of this execution is performed at control server 124 and applied to the replication control information in database 126, and some of the execution is performed at database server 116a and applied to the replication control information in database 122. As an example, if a new column is added to a source table, then association 212 within subscription register 204 is modified so that the new column can be identified, SUBSCRIPTION COLUMN table 218 is modified to include the new column, and SCHEMA CHANGE table 220 is modified to include a subscription set name associated with the new column.

Figure 4:
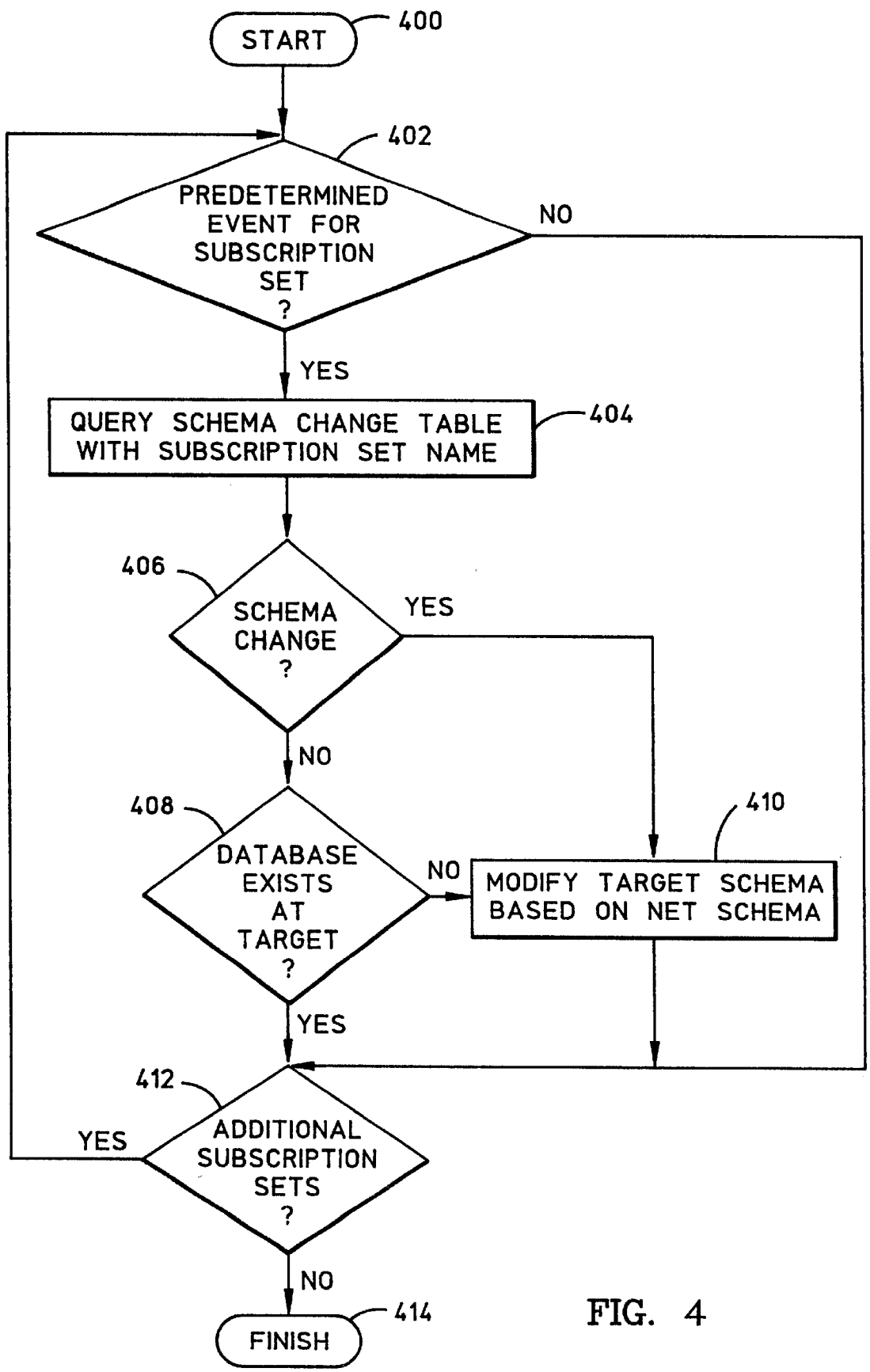
FIG. 4 is a flowchart describing another aspect of the method of performing the design synchronization.

FIG. 4 is a flowchart describing, in part, a method of planned notification of a design change. (As mentioned earlier, "surprise" notification is also understood, and described later in relation to pseudocode associated with FIGS. 4, 5A, and 5B.) Beginning at a start block 400, the target checks if a predetermined event associated with a subscription set has occurred (step 402). The predetermined event may be any event, such as a time period expiration or, if the target is a portable computer, a recently established connection between the portable computer and the network (whether connected via wireline or wirelessly). If the event has not occurred, the flowchart continues where the target checks for additional subscription sets remaining (step 412). If additional subscription sets remain, the method continues back at step 402; otherwise, the method ends at an end block 414.

If the predetermined event has occurred and is detected at step 402, the target queries SCHEMA CHANGE table 220 with the subscription set name (step 404). If the name is in SCHEMA CHANGE table 220, then a change has occurred for that subscription set. If a schema change is detected (step 406), then the target modifies the target schema based on the net schema (step 410), which is described below in more detail.

If no schema change is detected for the subscription set at step 406, then the target checks if a target database associated with the subscription set name exists at the target (step 408). If the target database does not exist, the target modifies the target schema at step 410. If the target database exists, the method continues at step 412 to check for additional subscription sets. Again, if additional subscription sets remain, the method continues back at step 402; otherwise, the method ends at end block 414.

Figure 5A:
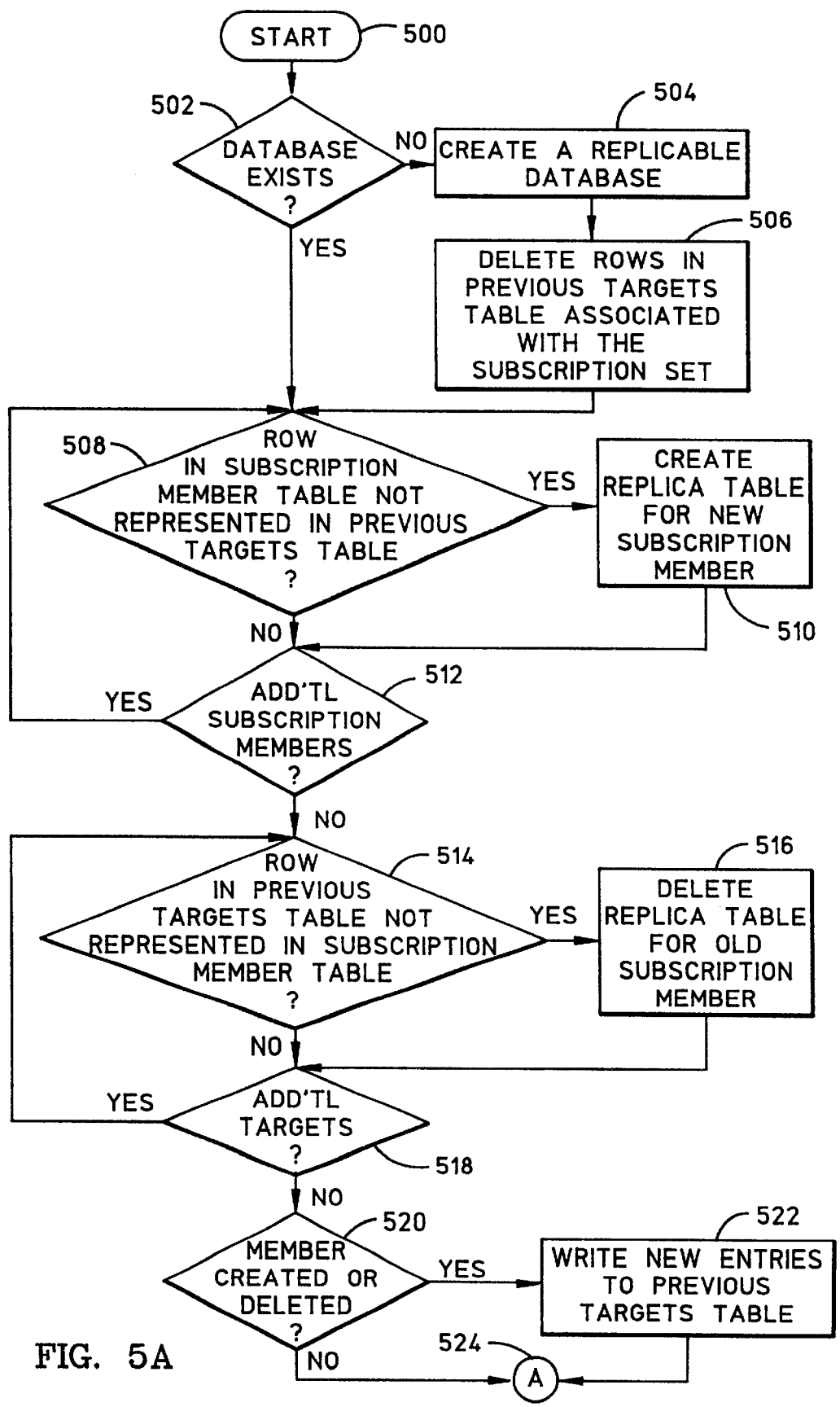
FIG. 5A is a flowchart describing another aspect of the method of performing the design synchronization.
Figure 5B:
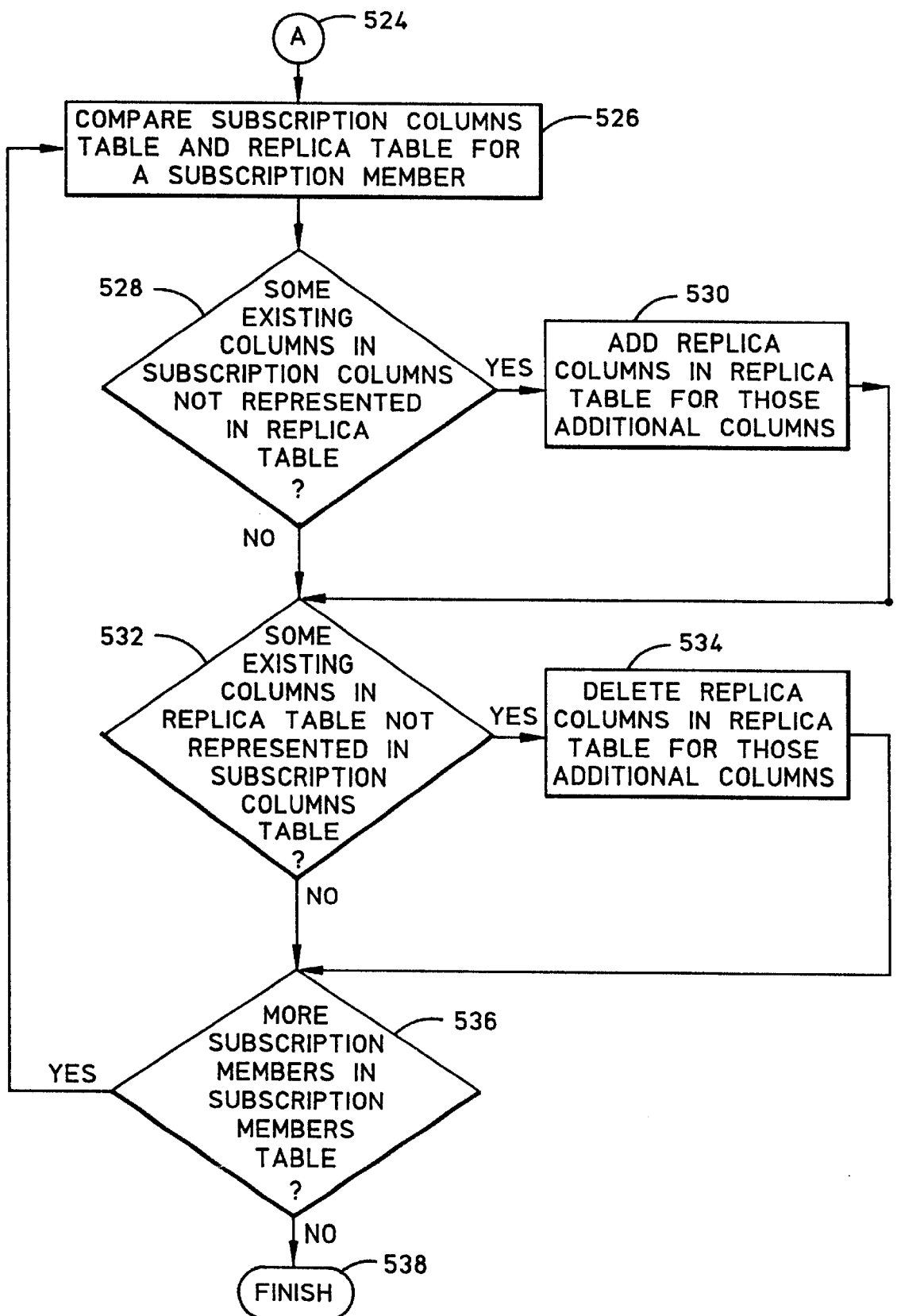
FIG. 5B is a continuation of the flowchart of FIG. 5A, describing another aspect of the method of performing the design synchronization.

FIGS. 5A and 5B are flowcharts describing a method of modifying target schema based on net schema changes. This method may be incorporated in step 410 of FIG. 4. Beginning at a start block 500, the target checks if the target database associated with the subscription set name exists at the target (step 502). If not, the target creates (as replicable) the target database at the target (step 504) and deletes those rows in PREVIOUS TARGETS table 222 associated with the subscription set (step 504). After step 504, or if it is determined that the target database exists at step 502, the method continues at step 508.

The target checks if a row in SUBSCRIPTION MEMBER table 216 is not represented in PREVIOUS TARGETS table 222 (step 508). If true for this row, then the target creates a replica table associated with the "new" subscription member (step 510). After step 510, or if it is determined that the row is indeed represented at step 508, the method continues at step 512. The target checks for addition subscription members in SUBSCRIPTION MEMBER table 216 (step 512). If there are additional subscription members, the method repeats step 508 for the next row.

When all rows of SUBSCRIPTION MEMBER table 216 have been exhausted, the method continues at step 514. The target checks if a row in PREVIOUS TARGETS 222 table is not represented in SUBSCRIPTION MEMBER table 216 (step 514). If true for this row, then the target deletes a replica table associated with the "old" subscription member (step 516). After step 516, or if it is determined that the row is indeed represented at step 514, the method continues at step 518. The target checks for additional targets in PREVIOUS TARGETS table 222 (step 518). If there are additional targets, the method repeats step 514 for the next row.

When all rows of PREVIOUS TARGETS table 222 have been exhausted, the target checks if any subscription member has been created or deleted (step 520). If true, the target writes the new, updated entries into PREVIOUS TARGETS table 222 (step 522). After step 522, or if no subscription member has been created or deleted at step 520, the method continues at a flowchart connector 524 (or circle "A" as shown in FIG. 5A).

Continuing at FIG. 5B, at flowchart connector 524 or circle "A", the target compares SUBSCRIPTION COLUMN table 218 and a replica table for a particular subscription member (step 526). If some existing columns in SUBSCRIPTION COLUMN table 218 do not having existing counterparts in the replica table (step 528), the target adds replica columns in the replica table for those additional columns (step 530). If some existing columns in the replica table do not have existing counterparts in SUBSCRIPTION COLUMN table 218 (step 532), the target deletes replica columns in the replica table for those additional columns (step 534).

The target then checks if there are additional subscription members in SUBSCRIPTION MEMBER table 216 (step 536). If true, the method repeats at step 526 for the next subscription member, until all subscription members are exhausted. Otherwise, the flowchart ends at an end block 538. Preferably, data synchronization occurs immediately after the described design synchronization.

The method may be described more particularly in the exemplary pseudocode below, which assumes DB2 at the source and Microsoft Jet at the target. The pseudocode additionally describes the handling of surprise notifications. Preferably, the method described in relation to FIGS. 4, 5A, and 5B, including the pseudocode and method steps described below, is employed using computer software executed by processor 112 (FIG. 1) at the target. The computer software may be embodied in a storage medium (such as a computer disk).

```
PSEUDOCODE
/*      ****************************************************************    */
/*                    Pseudocode for planned notification                    */
/*      ****************************************************************    */
IF a predetermined event has occurred for this subscription set,
   THEN
     (Check the subscription set for schema change.)
     Query (e.g., using SQL) the SCHEMA CHANGE table at the control
     server for the subscription set.
     Check (e.g., using DAO) if a target database associated with the
     subscription set exists.
     IF the schema has changed OR the target database does not exist,
        THEN
        Modify the target schema based on net schema. (Described
        below.)
/*      ****************************************************************    */
/*              Pseudocode for target modification based on net schema.      */
/*      ****************************************************************    */
     IF the target database does not exist,
        THEN
          Create the target database as replicable.
            Delete rows in the PREVIOUS TARGETS table for the
            subscription set.
     END
     FOR each row in the SUBSCRIPTION MEMBER table for the
     subscription set that is not represented in the PREVIOUS
     TARGETS table,
        Create a corresponding replica table in the target
        database.
     END
     FOR each row in the PREVIOUS TARGETS table for the
     subscription set that is not represented in the SUBSCRIPTION
     MEMBER table for the subscription set,
        Delete a corresponding replica table from the target
        database.
     END
     IF a subscription member has been added OR deleted,
        THEN
          Update the PREVIOUS TARGETS table with entries for the
          subscription set.
     END
     /* Assume now that the SUBSCRIPTION MEMBER table and the
        target database list the same replica tables. */
     FOR each subscription member of the subscription set,
        IF rows in the SUBSCRIPTION COLUMN table for the
        subscription set describe more columns than are currently
        contained in the replica table,
           THEN
             Add (e.g, using DAO) the columns to the replica table.
        END
        IF there are more columns in the replica table than are
        listed in the SUBSCRIPTION COLUMN table for the
        subscription set,
           THEN
             Delete (e.g, using DAO) the columns from the replica
```

```
                    table.
                END
                /* Note: Microsoft Jet has the capability to "ALTER DROP"
                    as well as "ALTER ADD" columns; a feature not supported
                    by DB2. */
            END /* for each member of the subscription set */
        END /* schema change or target database creation */
        Delete rows in the SCHEMA CHANGE table for the subscription set.
END /* for each event occurring for a subscription set */
/*      ****************************************************************    */
/*                      Pseudocode for surprise notification.                */
/*      ****************************************************************    */
WHILE performing data synchronization against the target database:
    IF there are tables or columns missing which should be present,
    THEN
        Cease performance of data synchronization.
        Perform design synchronization (the target schema modification
        above) to handle the surprise notification.
        Re-perform data synchronization against the target database.
    END
END
/*      ****************************************************************    */
```

Figure 8:
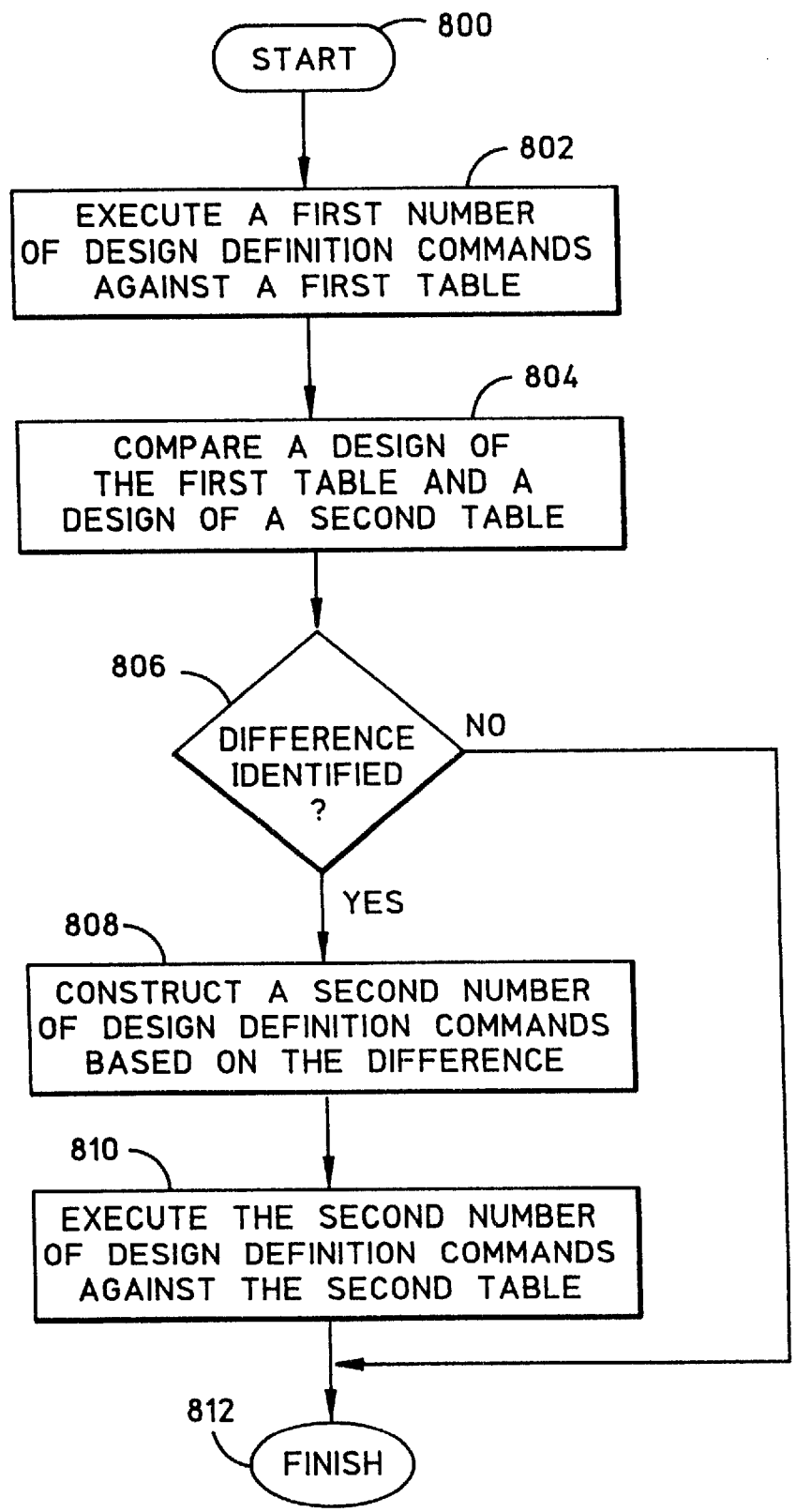
FIG. 8 is a flowchart describing a method of performing design synchronization in a computer system, where the design of a source table is modified.

Referring now to FIG. 8, a flowchart is shown which describes a method of performing design synchronization in a computer system, where the design of a source table is modified. Beginning at a start block 800, a first server executes a first number of data definition commands against a first table located in a first database (step 802). As described above, the commands are typically received responsive to inputs from a replication administrator over a first time period. When executed, these commands alter the design of the first table. The first database may be a relational database where the data definition commands are SQL commands.

In response to some predetermined event after the first time period a second server compares the design of the first table and a design of a (corresponding) second table located in a second database (step 804). The second server checks if a difference in the design is identified (step 806). Assuming a design change has been made, the second server does indeed identify the difference.

In response thereto, the second server constructs (or furnishes or selects) a second number of data definition commands based on the difference in the designs (step 808). In general, the second number of data definition commands produces the same design results for the second table as the first number of data definition commands produced for the first table.

In many cases, step 808 furnishes a second number of data definition commands that is less than the first number of data definition commands. Preferably, this step furnishes the minimum number of data definition commands to execute the net schema change. Depending on the nature and quantity of the changes made to the source, the first and the second numbers of commands may be greater or equal to one; the first and the second numbers may or may not be equal to each other.

Also preferably, step 808 furnishes a second number of data definition commands using syntax supported at the target, which may include syntax not supported at the source. For example, the different syntax may include "extensions" supported at the target but not supported at the source.

In some cases, step 806 may include identifying at least one column in the first table that is not represented in the second table. Accordingly, step 808 would include furnishing at least one data definition command executable to add at least one replica column in the second table which corresponds to the at least one column. In other cases, step 806 may include identifying at least one column in the second table that is not represented in the first table. Here, step 808 would include furnishing at least one data definition command executable to delete the at least one column. In even other cases, both such identifications are made at step 806.

After step 808, the second server executes the second number of data definition commands against the second table (step 810). When executed, these commands alter a design of the second table to accord with the design of the first table. Since steps 808 and 810 (and preferably steps 804 and 806) are performed at the target, target-specific syntax is advantageously supported. The flowchart ends at a finish block 812, but the method preferably repeats for other source/target tables and/or for a subsequent design synchronization. Data synchronization immediately follows design synchronization.

Referring now to FIGS. 6 and 7, examples of design definition statements or commands, simplified for clarity, are illustrated. Such design definition commands are executed against a source and a target as described above. In FIGS. 6 and 7, the commands are sequentially ordered from the time of execution, from top to bottom.

The example in FIG. 6 describes a first number of design definition commands 600 executed against the source, and a second number of design definition commands 602 executed against the target. Commands 600 include three design definition commands, namely commands 604, 606, and 608 executable to add or delete columns to or from a particular data table. More particularly, command 604 describes an "add column" command, one which is executable to add a column named QUANTITY_COLUMN to a table named MERCHANDISE_TABLE. Command 606 also describes an add column command, one which is executable to add a column named PRICE_COLUMN to the MERCHANDISE_TABLE. Command 608 describes a "delete column" command, one which is executable to delete the column named QUANTITY_COLUMN from the MERCHANDISE_TABLE.

On the other hand, command 602 executed on the target side is a single command. More particularly, command 602 is an add column command, one which is executable to add a column named PRICE_COLUMN to a replica table named MERCHANDISE_TABLE. As described earlier, commands such as command 602 are constructed based on net schema change, and will typically provide the same schema results as commands 600.

Similar to that in FIG. 6, the example in FIG. 7 describes a first number of design definition command(s) 700 executed against the source, and a second number of design definition command(s) 702 executed against the target. Commands 700 include two design definition commands, namely commands 704 and 706 executable to drop and create tables in a database. More particularly, command 704 describes a "drop table" command, one which is executable to drop a table named MERCHANDISE_TABLE which has three columns named ITEM_COLUMN, PRICE_COLUMN, and QUANTITY_COLUMN. Command 706 describes a "create table" command, one which is executable to (re) create MERCHANDISE_TABLE, but only with columns ITEM_COLUMN and PRICE_COLUMN. In this example, the source does not support a "delete column" command which would more directly provide the desired result at the source.

On the other hand, command 702 executed on the target side is a single command. More particularly, command 702 is a delete column command, one which is executable to delete a column named QUANTITY_COLUMN to a replica table named MERCHANDISE_TABLE. Here, the target supports a delete column command (whereas the source does not). Again, commands such as command 702 are constructed based on net schema change, and will typically provide the same schema results as commands 700.

Thus, a method of and apparatus for performing design synchronization is described. Advantageous replication support can be provided for personal DBMSs in local area network (LAN), occasionally-connected, and mobile environments. Preferred design synchronization allows for autonomous data definition activity, partially completed previous data synchronization, translation of design changes into target-specific syntax, minimal equivalent operations against the target, and local, independent objects.

It should be understood that modifications to the above described embodiments may be made without departing from the true spirit and scope of the present invention, as will be apparent to those skilled in the art.

We claim:

1. A method of performing design synchronization in a computer system, the computer system having at least a first database and a second database, the method comprising:

executing, during a first time period, a first number of data definition commands against a first table located in the first database, thereby altering a design of the fist table;

comparing the design of the first table and a design of a second table located in the second database;

identifying a difference between the designs of the first and second tables;

constructing a second number of data definition commands based on the difference between the designs, the second number of commands being less than the first number of data definition commands; and executing, during a second time period after the first time period, the second number of data definition commands against the second table, thereby altering the design of the second table.

2. The method according to claim 1, wherein the second number of data definition commands comprises a minimum number of data definition commands reflecting the difference between the designs.

3. The method according to claim 1, wherein executing a first number of data definition commands comprises executing a first number of data definition commands comprising Structured Query Language (SQL) statements.

4. The method according to claim 1, wherein constructing comprises constructing a second number of data definition commands including a data definition command having a different syntax than any of the first number of data definition commands.

5. The method according to claim 1, wherein identifying comprises identifying at least one column in the first table that is not represented in the second table, and wherein constructing comprises constructing at least one data definition command executable to add at least one replica column in the second table which corresponds to the at least one column.

6. The method according to claim 1, wherein identifying comprises identifying at least one column in the second table that is not represented in the first table, and wherein constructing comprises constructing at least one data definition command executable to delete the at least one column.

7. The method according to claim 1, wherein the computer system includes a computer having a processor and the first database.

8. The method according to claim 1, wherein the computer system includes a computer having a processor and the second database, and wherein constructing and executing the second number of data definition commands are performed by the computer.

9. A method of performing design synchronization in a computer system, the computer system having at least a first database and a second database, the method comprising:

executing, during a first time period, a first number of data definition commands against a first table located in the first database, thereby altering a design of the first table;

comparing the design of the first table and a design of a second table located in the second database;

identifying a difference between the designs of the first and second tables;

constructing a second number of data definition commands based on the difference between the designs, the second number of commands being the minimum number of data definition commands reflecting the difference between the designs; and executing, during a second time period after the first time period, the second number of data definition commands against the second table, thereby altering the design of the second table.

* * * * *

UNITED STATES PATENT AND TRADEMARK OFFICE
CERTIFICATE OF CORRECTION

PATENT NO.   : 6,397,125 B1
DATED        : May 28, 2002
INVENTOR(S)  : Robert D. Goldring and Scott K. Chan It is certified that error appears in the above-identified patent and that said Letters Patent is hereby corrected as shown below:

Please add the following new claims:

10. A computer readable medium of performing design synchronization in a computer system, the computer system having at least a first database and a second database, the computer readable medium comprising: executing, during a first time period, a first number of data definition commands against a first table located in the first database, thereby altering a design of the first table; comparing the design of the first table and a design of a second table located in the second database; identifying a difference between the designs of the first and second tables; constructing a second number of data definition commands based on the difference between the designs, the second number of commands being less than the first number of data definition commands; and executing, during a second time period after the first time period, the second number of data definition commands against the second table, thereby altering the design of the second table.

11. The computer readable medium according to claim 10, wherein the second number of data definition commands comprises a minimum number of data definition commands reflecting the difference between the designs.

12. The computer readable medium according to claim 10, wherein executing a first number of data definition commands comprises executing a first number of data definition commands comprising Structured Query Language (SQL) statements.

13. The computer readable medium according to claim 10, wherein constructing comprises constructing a second number of data definition commands including a data definition command having a different syntax than any of the first number of data definition commands.

14. The computer readable medium according to claim 10, wherein identifying comprises identifying at least one column in the first table that is not represented in the second table, and wherein constructing comprises constructing at least one data definition command executable to add at least one replic column in the second table which corresponds to the at least one column.

15. The computer readable medium according to claim 10, wherein identifying comprises identifying at least one column in the second table that is not represented in the first table, and wherein constructing comprises constructing at least one data definition command executable to delete the at least one column.

UNITED STATES PATENT AND TRADEMARK OFFICE
CERTIFICATE OF CORRECTION

PATENT NO. : 6,397,125 B1
DATED : May 28, 2002
INVENTOR(S) : Robert D. Goldring and Scott K. Chan It is certified that error appears in the above-identified patent and that said Letters Patent is hereby corrected as shown below:

16. The computer readable medium according to claim 10, wherein the computer system includes a computer having a processor and the first database.

17. The computer readable medium according to claim 10, wherein the computer system includes a computer having a processor and the second database, and wherein constructing and executing the second number of data definition commands are performed by the computer.

18. A computer readable medium of performing design synchronization in a computer system, the computer system having at least a first database and a second database, the computer readable medium comprising: executing, during a first time period, a first number of data definition commands against a first table located in the first database, thereby altering a design of the first table; comparing the design of the first table and a design of a second table located in the second database; identifying a difference between the designs of the first and second tables; constructing a second number of data definition commands based on the difference between the designs, the second number of commands being the minimum number of data definition commands reflecting the difference between the designs; and executing, during a second time period after the first time period, the second number of data definition commands against the second table, thereby altering the design of the second table.

Signed and Sealed this

Tenth Day of December, 2002

JAMES E. ROGAN
*Director of the United States Patent and Trademark Office*